(12) United States Patent
Zang et al.

(10) Patent No.: US 11,829,453 B2
(45) Date of Patent: Nov. 28, 2023

(54) METHOD FOR OPERATING AN ELECTRICAL CONTROL DEVICE AND ELECTRICAL CONTROL DEVICE

(71) Applicant: Lenze Automation GmbH, Aerzen (DE)

(72) Inventors: Eduard Zang, Hannover (DE); Detlef Stork, Minden (DE); Peter Hesse, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 470 days.

(21) Appl. No.: 16/639,434

(22) PCT Filed: Jul. 31, 2018

(86) PCT No.: PCT/EP2018/070764
§ 371 (c)(1),
(2) Date: Dec. 3, 2020

(87) PCT Pub. No.: WO2019/034414
PCT Pub. Date: Feb. 21, 2019

(65) Prior Publication Data
US 2021/0081513 A1 Mar. 18, 2021

(30) Foreign Application Priority Data
Aug. 18, 2017 (DE) .................. 10 2017 214 443.2

(51) Int. Cl.
*G06F 21/10* (2013.01)
(52) U.S. Cl.
CPC .................................. *G06F 21/105* (2013.01)
(58) Field of Classification Search
CPC .......... G06F 21/73; G06F 21/44; G06F 21/10; G06F 21/105
See application file for complete search history.

(56) References Cited

U.S. PATENT DOCUMENTS

| 6,367,019 | B1 | 4/2002 | Ansell et al. |
| 8,214,644 | B2 | 7/2012 | Chu et al. |

(Continued)

FOREIGN PATENT DOCUMENTS

| EP | 1 166 265 B1 | 4/2010 |
| EP | 2 854 062 A1 | 4/2015 |

OTHER PUBLICATIONS

International Search Report (PCT/ISA/210) issued in PCT Application No. PCT/EP2018/070764 dated Oct. 26, 2018 with English translation (five pages).

(Continued)

*Primary Examiner* — Dao Q Ho
(74) *Attorney, Agent, or Firm* — Crowell & Moring LLP

(57) ABSTRACT

A method operates an electrical control device on the basis of license information, which is stored in a removable storage medium. The method includes the following steps, which are carried out by the control device: reading out a removable storage medium identification of the removable storage medium, reading a license file, which is stored in the removable storage medium, extracting a license file identification from the read license file, comparing the license file identification with the removable storage medium identification, and when the license file identification matches the removable storage medium identification, extracting license information from the license file and operating the control device in accordance with the license information and storing the license file identification and the license information in the control device.

8 Claims, 1 Drawing Sheet

(56) References Cited

U.S. PATENT DOCUMENTS

| | | |
|---|---|---|
| 8,601,280 B2 | 12/2013 | Harada |
| 9,709,970 B2 | 7/2017 | Kubota et al. |
| 2002/0196940 A1* | 12/2002 | Isaacson .......... G11B 20/00847 |
| | | 380/227 |
| 2006/0018454 A1 | 1/2006 | Nonaka et al. |
| 2006/0047604 A1 | 3/2006 | Kraft-Oz et al. |
| 2008/0319779 A1* | 12/2008 | Hughes .................. G06Q 30/06 |
| | | 705/310 |
| 2015/0081047 A1* | 3/2015 | Kubota ................... G06F 21/10 |
| | | 700/40 |

OTHER PUBLICATIONS

German-language Written Opinion (PCT/ISA/237) issued in PCT Application No. PCT/EP2018/070764 dated Oct. 26, 2018 (seven pages).

\* cited by examiner

METHOD FOR OPERATING AN ELECTRICAL CONTROL DEVICE AND ELECTRICAL CONTROL DEVICE

BACKGROUND AND SUMMARY OF THE INVENTION

The invention relates to a method for operating an electrical control device and to an electrical control device.

Electrical control devices often use exchangeable storage media on which license information or a so-called "application credit" can be stored in the form of one or more files. The license information is used, for example, to realize a licensing model for a user of the control device. Such a licensing model may be based on a so-called credit concept, for example, in which specific functions of the control device are available to the user without restriction or are not available to the user or are available to the user only in a restricted way, depending on the license information.

If the license information is inadvertently erased and/or the exchangeable storage medium is inadvertently formatted, the "application credit" may be lost in the worst case.

The invention is based on the object of providing a method for operating an electrical control device and an electrical control device which make possible secure management of license information.

The invention achieves this object by means of a method for operating an electrical control device, and an electrical control device, according to the claimed invention.

The method serves for operating an electrical control device on the basis of license information stored on an exchangeable storage medium, for example in the form of one or more files. The files can contain the license information in structured form, for example.

Firstly, the control device reads out an exchangeable storage medium identification of the exchangeable storage medium. The exchangeable storage medium identification can be an identification which unambiguously identifies the exchangeable storage medium. The exchangeable storage medium identification can be configured in such a way that it is not alterable by a user of the control device.

The control device furthermore reads out a license file stored on the exchangeable storage medium, assuming of course that the license file is present on the exchangeable storage medium. If no license file is present on the exchangeable storage medium or if the exchangeable storage medium cannot be accessed, the procedure as described further below is adopted.

Reading the exchangeable storage medium identification and the license file can be carried out in any desired order.

Afterward, the control device extracts a license file identification stored in the license file from the license file read.

The control device then compares the extracted license file identification with the exchangeable storage medium identification. If the license file identification corresponds to the exchangeable storage medium identification, a valid license file or a valid exchangeable storage medium is deduced, such that license information stored in the license file is read out from the license file and used for controlling the functional scope of the control device. Afterward, the control device stores in a nonvolatile memory, which in particular is internal to the control device, the license file identification and the license information for a reconstruction possibly required in the event of the license file being lost.

For the case where no license file is stored on the exchangeable storage medium and/or the exchangeable storage medium was reformatted or is unformatted, the control device compares the exchangeable storage medium identification with the license file identification stored in the control device in order to determine whether a valid exchangeable storage medium is involved. Typically, at least when the control device is initially started up, an exchangeable storage medium identification is stored in the control device, and so such an identification can consequently be assumed to be present.

If a valid exchangeable storage medium is involved, i.e. if the license file identification stored in the control device corresponds to the exchangeable storage medium identification, the control device generates a license file on the exchangeable storage medium, wherein the generated license file contains the license file identification stored in the control device and the license information stored in the control device. This enables a user to retain his/her application credit despite inadvertent erasure or formatting of the exchangeable storage medium.

In accordance with one embodiment, the license file identification and the license information are stored in an encrypted manner in the license file, with the result that an unauthorized manipulation of the license file identification and/or of the license information can be prevented.

In accordance with one embodiment, the control device has a set of possible functions, wherein the license information controls which of the functions of the set of possible functions are able to be carried out, for example without delay.

In accordance with one embodiment, the exchangeable storage medium identification is an exchangeable storage medium serial number, for example a serial number of an SD card, which is stored in a so-called card identification (CID) register of the SD card as a so-called card serial number (PSN).

The invention furthermore relates to an electrical control device comprising an internal, nonvolatile memory, for example a Flash memory.

The control device furthermore comprises a read/write unit for reading from and writing to an exchangeable storage medium, for example an SD card write/read unit.

The control device furthermore comprises a control unit, for example in the form of a microprocessor and associated program memory, which control unit is configured to carry out a method described above.

In one embodiment, the control device comprises an exchangeable storage medium configured for storing license information.

The control device can be for example a frequency converter, a servoconverter or a so-called motion controller. Motion controllers are electrical control devices for closed-loop control of motion or open-loop control of motion, by means of which a pose, a velocity, an acceleration or a combination thereof can be influenced. A typical application is, for example, point-to-point position control and rotational speed control.

The exchangeable storage medium can be an SD card, for example.

The license file can be formed as a single file or consist of a file grouping composed of a plurality of different (sub)files. If the license file consists of a file grouping, for example the license file identification can be stored in one of the files and the license information can be stored in another of the files.

The invention is described in detail below with reference to the drawings.

DETAILED DESCRIPTION OF THE DRAWINGS

Figure 1:
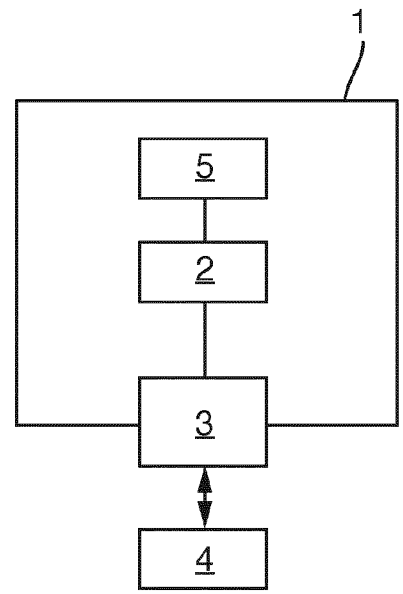
FIG. 1 shows an electrical control device.

FIG. 1 shows an electrical control device 1 in the form of a frequency converter having an internal, nonvolatile flash memory 2, an SD card read/write unit 3 for reading from and writing to an exchangeable storage medium 4 in the form of an SD card, and a microprocessor-based control unit 5, which controls the operation of the electrical control device 1, as is described in detail below with reference to FIG. 2.

The electrical control device 1 is operated on the basis of license information stored on the exchangeable storage medium 4. For this purpose, the control device 1 or the control unit 5 thereof carries out the following steps.

The control device 1 reads out an exchangeable storage medium identification in the form of a serial number of the exchangeable storage medium 4 and reads in, if present, the content of a license file stored on the exchangeable storage medium 4.

Afterward, the control device 1 extracts a license file identification from the license file read and compares the license file identification with the exchangeable storage medium identification. If the license file identification corresponds to the exchangeable storage medium identification, license information is extracted from the license file and the control device provides a functional scope dependent on the license information.

Finally, the license file identification and the license information are stored in the nonvolatile memory 2 of the electrical control device 1 for a possibly required reconstruction of the license file.

For the case where no license file is stored on the exchangeable storage medium 4 or the exchangeable storage medium 4 is unformatted or reformatted, the control device 1 compares the exchangeable storage medium identification with the license file identification stored in the control device 1.

If the license file identification stored in the control device 1 corresponds to the exchangeable storage medium identification, the control device 1 generates a license file on the exchangeable storage medium 4, wherein the license file generated contains the license file identification stored in the control device and the license information stored in the control device 1.

If the license file identification stored in the control device 1 does not correspond to the exchangeable storage medium identification, the electrical control device 1 likewise generates a license file on the exchangeable storage medium 4, wherein the license file generated contains license information in a form such that only test operation is possible.

The method according to the invention is elucidated below with reference to FIG. 2. FIG. 2 shows a schematic flow diagram of the method for operating the control device 1 from FIG. 1.

Figure 2:
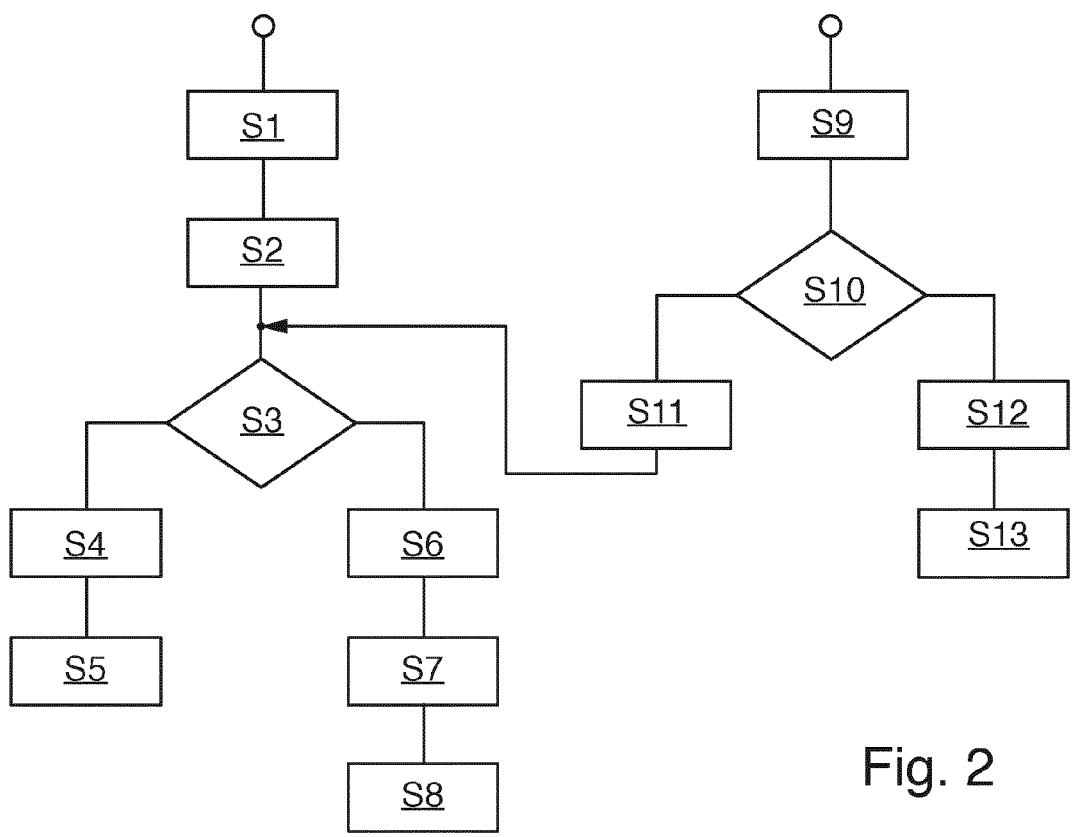
FIG. 2 shows a schematic flow diagram of a method for operating the control device from FIG. 1 on the basis of license information stored on an exchangeable storage medium.

FIG. 2 illustrates on the left the case where a license file is present on the exchangeable storage medium 4. The case where no license file is present on the exchangeable storage medium 4 is illustrated on the right.

In a step S1, after the control device 1 has been started, the license file is opened and read. The information "available application credit" and "volume ID" of the exchangeable storage medium in the form of the SD card 4 is extracted from the encrypted file.

In a step S2, the "volume ID" read out is compared with the actually present volume ID (serial number) of the SD card 4. If these items of information correspond, the "available application credit" and the "volume ID" are stored in the nonvolatile memory 2 for a possibly required reconstruction. Otherwise, error handling takes place, in the course of which for example only restricted operation or test operation of the control device 1 is possible.

In the event of correspondence between the "volume ID" read out and the actually present volume ID, a step S3 involves checking whether or not the "available application credit" read out is sufficient in comparison with the necessary "needed application credit".

If the "available application credit" is sufficient in comparison with the necessary "needed application credit", the operation of the electrical control device 1 without restrictions is enabled in a step S4 and normal operation with a full functional scope is started in a step S5.

If the "available application credit" is not sufficient in comparison with the necessary "needed application credit", in a step S6 the operation of the control device 1 is enabled only with restrictions, for example by virtue of the fact that a previously applied delay time is incremented by 10% and certain functions of the electrical control device 1 are not available until after the delay time has elapsed.

In a step S7, the delay time is stored as part of the license information in the license file on the exchangeable storage medium 4 and is likewise stored internally in the device on the nonvolatile memory 2.

Test operation with a restricted functional scope then follows in a step S8.

Referring now to the right-hand path in FIG. 2, in a step S9 it is established that although an exchangeable storage medium 4 is present, no license file is stored on the exchangeable storage medium 4.

A step S10 then involves checking whether a "volume ID" stored in the nonvolatile memory 2 corresponds to the actually present volume ID of the SD card 4.

If these items of information correspond, in a step S11 a license file is generated on the exchangeable storage medium 4, wherein the license file generated contains the license file identification stored in the control device 1 and the license information stored in the control device. The method subsequently branches to step S3.

If these items of information do not correspond, in a step S12 a license file is generated on the exchangeable storage medium 4, wherein the license file generated contains license information that only enables test operation of the control device 1.

Test operation of the control device 1 then takes place in step S13.

What is claimed is:

1. A method for operating an electrical control device on the basis of license information stored on an exchangeable storage medium, wherein the method comprises:
reading out an exchangeable storage medium identification of the exchangeable storage medium;
reading a license file stored on the exchangeable storage medium;

extracting a license file identification from the license file read;

comparing the license file identification with the exchangeable storage medium identification; and when the license file identification corresponds to the exchangeable storage medium identification:
(i) extracting license information from the license file and operating the electrical control device in accordance with the license information, and
(ii) storing the license file identification and the license information in the electrical control device, wherein for a case where no license file is stored on the exchangeable storage medium, the method further comprises:

comparing the exchangeable storage medium identification with a license file identification stored in the control device; and when the license file identification stored in the control device corresponds to the exchangeable storage medium identification, generating a license file on the exchangeable storage medium, wherein
the generated license file contains the license file identification stored in the control device and the license information stored in the control device.

2. The method according to claim 1, wherein the license file identification and the license information are stored in an encrypted manner in the license file.

3. The method according to claim 1, wherein the control device has a set of possible functions, wherein the license information controls which of the possible functions are able to be carried out.

4. The method according to claim 1, wherein the exchangeable storage medium identification is an exchangeable storage medium serial number.

5. An electrical control device, comprising:
an internal, nonvolatile memory; and
a microprocessor-based control unit configured to:
read out an exchangeable storage medium identification of the exchangeable storage medium;
read a license file stored on the exchangeable storage medium;
extract a license file identification from the license file read;
compare the license file identification with the exchangeable storage medium identification; and
when the license file identification corresponds to the exchangeable storage medium identification:
(i) extract license information from the license file and operate the electrical control device in a manner dependent on the license information, and
(ii) store the license file identification and the license information in the electrical control device, and for a case where no license file is stored on the exchangeable storage medium:
compare the exchangeable storage medium identification with a license file identification stored in the control device; and
when the license file identification stored in the control device corresponds to the exchangeable storage medium identification, generate a license file on the exchangeable storage medium, wherein
the generated license file contains the license file identification stored in the control device and the license information stored in the control device.

6. The electrical control device according to claim 5, wherein
the control device comprises the exchangeable storage medium, wherein the exchangeable storage medium is configured for storing license information.

7. The electrical control device according to claim 5, wherein
the control device is a frequency converter, a servoconverter or a motion controller.

8. The electrical control device according to claim 5, wherein
the exchangeable storage medium is an SD card.

* * * * *